US009874199B2

(12) United States Patent
Anselmi

(10) Patent No.: US 9,874,199 B2
(45) Date of Patent: Jan. 23, 2018

(54) WIND TURBINE ROTATING ELECTRIC MACHINE FRAME, AND ROTATING ELECTRIC MACHINE

(71) Applicant: WINDFIN B.V., Leimuiden (NL)

(72) Inventor: Norman Anselmi, Luxembourg (LU)

(73) Assignee: WINDFIN B.V., Leimuiden (NL)

( * ) Notice: Subject to any disclaimer, the term of this patent is extended or adjusted under 35 U.S.C. 154(b) by 266 days.

(21) Appl. No.: 14/416,516

(22) PCT Filed: Jul. 25, 2013

(86) PCT No.: PCT/IB2013/056118
§ 371 (c)(1),
(2) Date: Jan. 22, 2015

(87) PCT Pub. No.: WO2014/016803
PCT Pub. Date: Jan. 30, 2014

(65) Prior Publication Data
US 2015/0204314 A1 Jul. 23, 2015

(30) Foreign Application Priority Data
Jul. 25, 2012 (IT) .............................. MI2012A1302

(51) Int. Cl.
F03D 13/20 (2016.01)
F03D 9/25 (2016.01)
(Continued)

(52) U.S. Cl.
CPC .............. *F03D 11/045* (2013.01); *F03D 9/25* (2016.05); *F03D 13/22* (2016.05); *H02K 7/1838* (2013.01);
(Continued)

(58) Field of Classification Search
CPC ............................ H02K 7/1838; H02K 7/085
See application file for complete search history.

(56) References Cited

U.S. PATENT DOCUMENTS 7,385,306 B2    7/2008 Casazza et al.
8,816,546 B2 *  8/2014 Bywaters ................. H02K 1/16
                                               310/216.049
(Continued)

FOREIGN PATENT DOCUMENTS

EP    2148090 A1    1/2010
EP    2187506 A1    5/2010
(Continued)

OTHER PUBLICATIONS

International Search Report and Written Opinion for International Application No. PCT/IB2013/056118 dated Feb. 3, 2014.

*Primary Examiner* — Jessica Cahill
*Assistant Examiner* — Daphne M Barry
(74) *Attorney, Agent, or Firm* — Neal, Gerber & Eisenberg LLP

(57) ABSTRACT

A frame of a rotating electric machine of a wind turbine extends about an axis of rotation, and has a tubular structure having a cylindrical face and configured to support a plurality of active segments along the cylindrical face; an annular flange configured to connect the rotating electric machine to a main frame of a wind turbine; and a ring having an annular seat for a bearing; and wherein the tubular structure, the annular flange, and the ring are formed in one piece.

26 Claims, 4 Drawing Sheets

(51) Int. Cl.
  *H02K 7/18*   (2006.01)
  *H02K 7/08*   (2006.01)
  *F03D 11/04*  (2006.01)

(52) U.S. Cl.
  CPC ... *F05B 2220/7066* (2013.01); *F05B 2230/10* (2013.01); *F05B 2230/21* (2013.01); *H02K 7/085* (2013.01); *Y02E 10/725* (2013.01); *Y02P 70/523* (2015.11)

(56) References Cited

U.S. PATENT DOCUMENTS

| | | | | |
|---|---|---|---|---|
| 8,912,680 | B2* | 12/2014 | Gelmini | F03D 11/00 |
| | | | | 290/44 |
| 9,154,024 | B2* | 10/2015 | Jore | H02K 1/30 |
| 9,279,413 | B2* | 3/2016 | Ebbesen | F03D 11/00 |
| 2012/0112463 | A1* | 5/2012 | Gelmini | F03D 1/003 |
| | | | | 290/55 |
| 2012/0181792 | A1* | 7/2012 | Pettersen | F03D 9/002 |
| | | | | 290/55 |

FOREIGN PATENT DOCUMENTS

| | | |
|---|---|---|
| EP | 2230750 A2 | 9/2010 |
| WO | WO 2011/092565 A1 | 8/2011 |

\* cited by examiner

WIND TURBINE ROTATING ELECTRIC MACHINE FRAME, AND ROTATING ELECTRIC MACHINE

PRIORITY CLAIM

This application is a national stage application of PCT/IB2013/056118, filed on Jul. 25, 2013, which claims the benefit of and priority to Italian Patent Application No. MI2012A 001302, filed on Jul. 25, 2012, the entire contents of which are each incorporated by reference herein.

BACKGROUND

In certain known wind turbines, the rotating electric machine frame serves to: transmit the forces and moments generated on the rotating machine to the main frame of the wind turbine; prevent excessive vibration of the rotating machine; and support the rotor and possibly also the blade assembly.

Wind turbine rotating electric machines, particularly those used on large wind turbines, must have special characteristics, as compared with ordinary rotating electric machines. For example, they must be relatively lightweight, must be relatively easily accessible for maintenance, and their component parts must be relatively easy to assemble and disassemble, both when installing and repairing the machine. Moreover, the rotating electric machine must be connectable relatively easily to the main frame and the blade assembly, and must be so designed as not to require excessively large, heavy main frames.

In wind turbine technology, the trend is towards increasingly powerful (i.e., increasingly large-diameter) rotating electric machines. At the same time, a relatively small air gap is required to achieve optimum efficiency of the machine. The difficulty of producing rotating electric machines with a radially small, circumferentially constant air gap therefore increases alongside an increase in the diameter of the machine.

SUMMARY

The present disclosure relates to a wind turbine rotating electric machine frame.

It is an advantage of the present disclosure to provide a frame for a large rotating electric machine of a wind turbine, configured to ensure a relatively high degree of efficiency of the rotating electric machine.

According to the present disclosure, there is provided a wind turbine rotating electric machine frame, the frame extending about an axis of rotation and comprising a tubular structure having a cylindrical face and configured to support a plurality of active segments along the cylindrical face; an annular flange configured to connect the rotating electric machine to a main frame of a wind turbine; and a ring having an annular seat for a bearing; and wherein the tubular structure, the annular flange, and the ring are formed in one piece.

In accordance with the present disclosure, it is possible to achieve a relatively highly rigid frame preventing any substantial assembly errors in the concentricity of the ring and tubular structure, and therefore to achieve relatively small air gaps.

In various embodiments of the present disclosure, the frame is cast and, in certain embodiments, made of steel. Casting makes it possible to rapidly produce relatively complex shapes, possibly requiring finish-machining.

More specifically, the tubular structure and the ring are finished by mechanical chip-forming machining along the cylindrical face and the annular seat respectively.

The cylindrical face and the annular seat must be as concentric as possible to minimize the size of the air gap.

In certain embodiments of the present disclosure, the cylindrical face of the tubular structure and the annular seat of the ring are formed simultaneously by a chip-forming machine, to ensure maximum concentricity.

In certain embodiments of the present disclosure, the tubular structure comprises a plurality of fastening members arranged along the cylindrical face about the axis of rotation and configured to anchor the active segments to the tubular structure; each fastening member, in certain embodiments, being defined by an axial groove with a dovetail cross section.

This provides for relatively easy, trouble-free insertion and withdrawal of the active segments.

In certain embodiments of the present disclosure, the frame comprises a plurality of first arms configured to connect the annular flange to the tubular structure; the first arms, in certain embodiments, extending radially with respect to the axis of rotation. In these embodiments, the radial arms provide for transmitting forces and moments from the stator wall to the annular flange and the main frame.

The annular flange is, in certain embodiments, located at one end of the tubular structure, along the axis of rotation. In other words, the tubular structure projects with respect to the annular flange.

The tubular structure thus defines a highly accessible space.

In certain embodiments of the present disclosure, the annular flange and the ring are connected by second arms to the advantage of the relatively light weight of the frame. The second arms effectively transmit the forces and moments induced by the rotor and the blade assembly to the annular flange and main frame, without greatly increasing the weight of the frame.

In certain embodiments of the present disclosure, the ring is located in a mid-position with respect to the tubular structure, along the axis of rotation. In other words, the ring is located in the inner space defined by the tubular structure, to provide as balanced support as possible.

In certain embodiments of the present disclosure, the annular flange is smaller in diameter than the cylindrical face, and the ring is smaller in diameter than the annular flange.

The difference in the diameters of the cylindrical face and the annular flange enables large tubular stators to be connected to small-diameter main frames. And the difference in the diameters of the annular flange and the ring enables the bearing to be withdrawn axially through the annular flange.

The present disclosure also relates to a rotating electric machine.

According to the present disclosure, there is provided a rotating electric machine for a wind turbine configured to produce electric energy, the rotating electric machine comprising a tubular stator, in turn comprising a tubular structure and a plurality of active segments fitted to the tubular structure; a tubular rotor, which comprises a plurality of further active segments facing the active segments to define an air gap, is housed inside the tubular stator, and rotates about an axis of rotation with respect to the tubular stator; and a frame as described and configured to define the tubular structure of the tubular stator, and to support the tubular rotor.

In this way, it is possible to minimize the size of the air gap both radially and axially.

In certain embodiments of the present disclosure, the rotating electric machine comprises a bearing housed in the annular seat and configured to support the tubular rotor.

In certain embodiments, the rotating electric machine comprises one bearing configured to support the rotor. The bearing is housed in the annular seat of the ring to ensure the bearing and the tubular structure are as concentric as possible.

In certain embodiments of the present disclosure, the tubular rotor comprises a further tubular structure; and a radial structure configured to connect to the bearing.

The tubular rotor is thus extremely straightforward and relatively compact in design to minimize deformation of the tubular rotor itself.

In certain embodiments of the present disclosure, the tubular rotor and the frame are connectable rigidly to each other; in particular, the ring and the tubular rotor being configured to form a bolted connection. In this way, the bearing can be disassembled easily.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
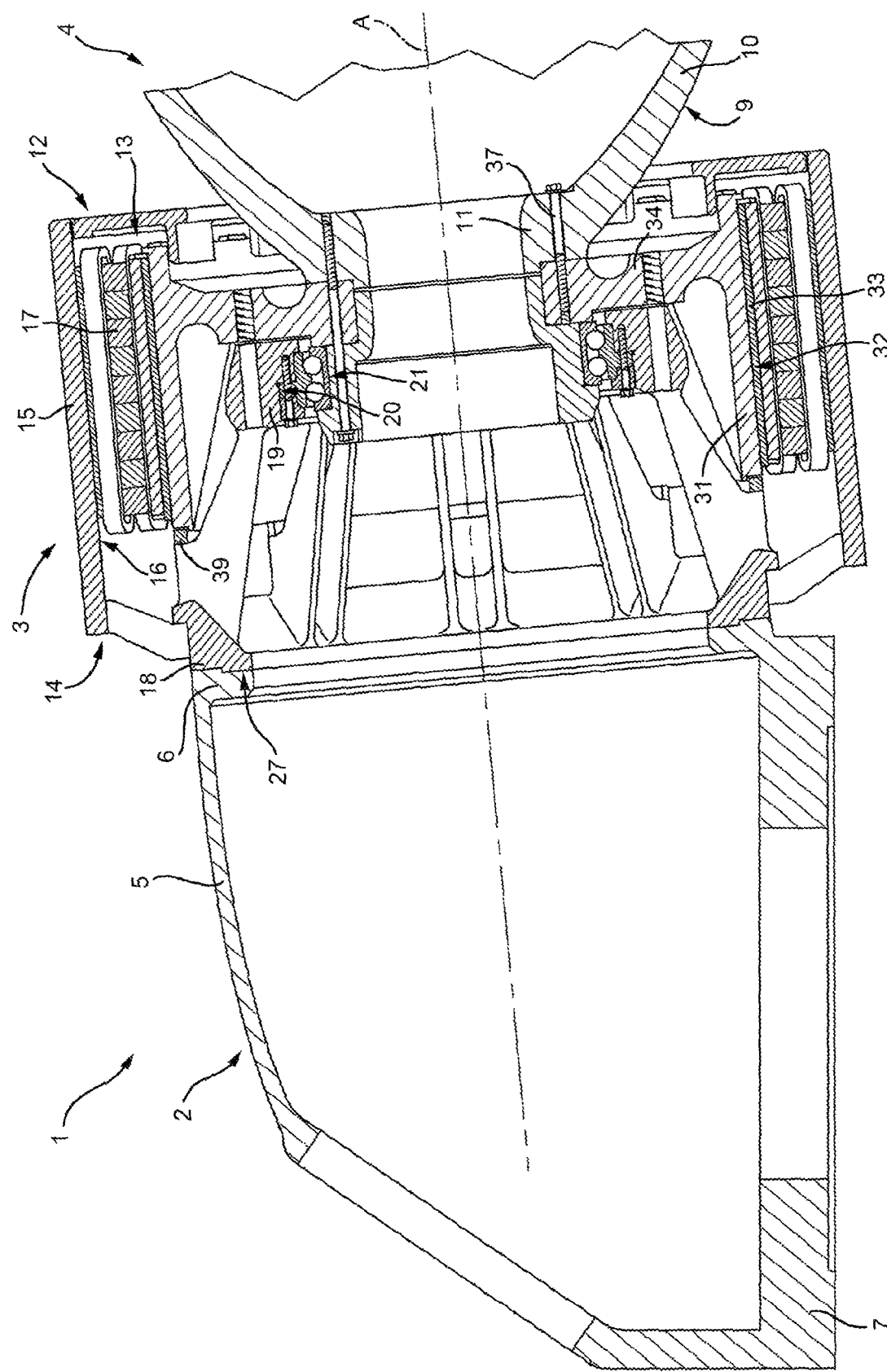
FIG. 1 shows a lateral section, with parts removed for clarity, of a wind turbine comprising a rotating electric machine in accordance with the present disclosure.

Referring now to the example embodiments of the present disclosure illustrated in FIGS. 1 to 5, number 1 in FIG. 1 indicates as a whole a wind turbine for generating electric energy. Wind turbine 1 is a direct-drive type. In the example shown, wind turbine 1 comprises a main frame 2; a rotating electric machine 3; and a blade assembly 4 which rotates about an axis of rotation A. Rotating electric machine 3 is located between main frame 2 and blade assembly 4, and, in addition to producing electric energy, also provides for supporting blade assembly 4, and for transmitting forces and moments induced by blade assembly 4 and rotating electric machine 3 itself to main frame 2.

In the example shown, main frame 2 is defined by a tubular, curved nacelle 5 comprising a circular end flange 6 configured to connect to rotating electric machine 3; an end flange 7 configured to house a pivot (not shown) connecting a vertical support (not shown); and an opening 8 formed in the wall of nacelle 5 to enable large component parts to be moved in and out of nacelle 5. In certain embodiments, opening 8 is substantially aligned with end flange 6.

Blade assembly 4 comprises a hub 9 connected to rotating electric machine 3; and a plurality of blades (not shown in the drawings). Hub 9 comprises a hollow member 10 configured to support the blades (not shown); and a flange 11 configured to connect to rotating electric machine 3.

Rotating electric machine 3 extends about axis of rotation A, and is substantially tubular to form a space between the hollow main frame 2 and hollow hub 9.

Rotating electric machine 3 according to the present disclosure comprises a tubular stator 12; and a tubular rotor 13, which is located inside tubular stator 12, and rotates about axis of rotation A with respect to tubular stator 12. Rotating electric machine 3 comprises a frame 14 configured to connect rotating electric machine 3 to main frame 2, and to support blade assembly 4, tubular stator 12, and tubular rotor 13.

Frame 14 extends about axis of rotation A, and comprises a tubular structure 15 having a cylindrical face 16 and configured to support a plurality of active segments 17 along cylindrical face 16; an annular flange 18 configured to connect rotating electric machine 3 to main frame 2 of wind turbine 1; and a ring 19 having an annular seat 20 for a bearing 21.

In other words, tubular structure 15 forming part of tubular stator 12, tubular stator 12 is also defined partly by frame 14. It should thus be appreciated that tubular stator 12 comprises tubular structure 15 and active segments 17.

Active segments 17—in the example shown, electric windings fitted to a ferromagnetic core—are substantially prismatic modular segments, which extend predominantly parallel to, and are equally spaced about, axis of rotation A.

Figure 2:
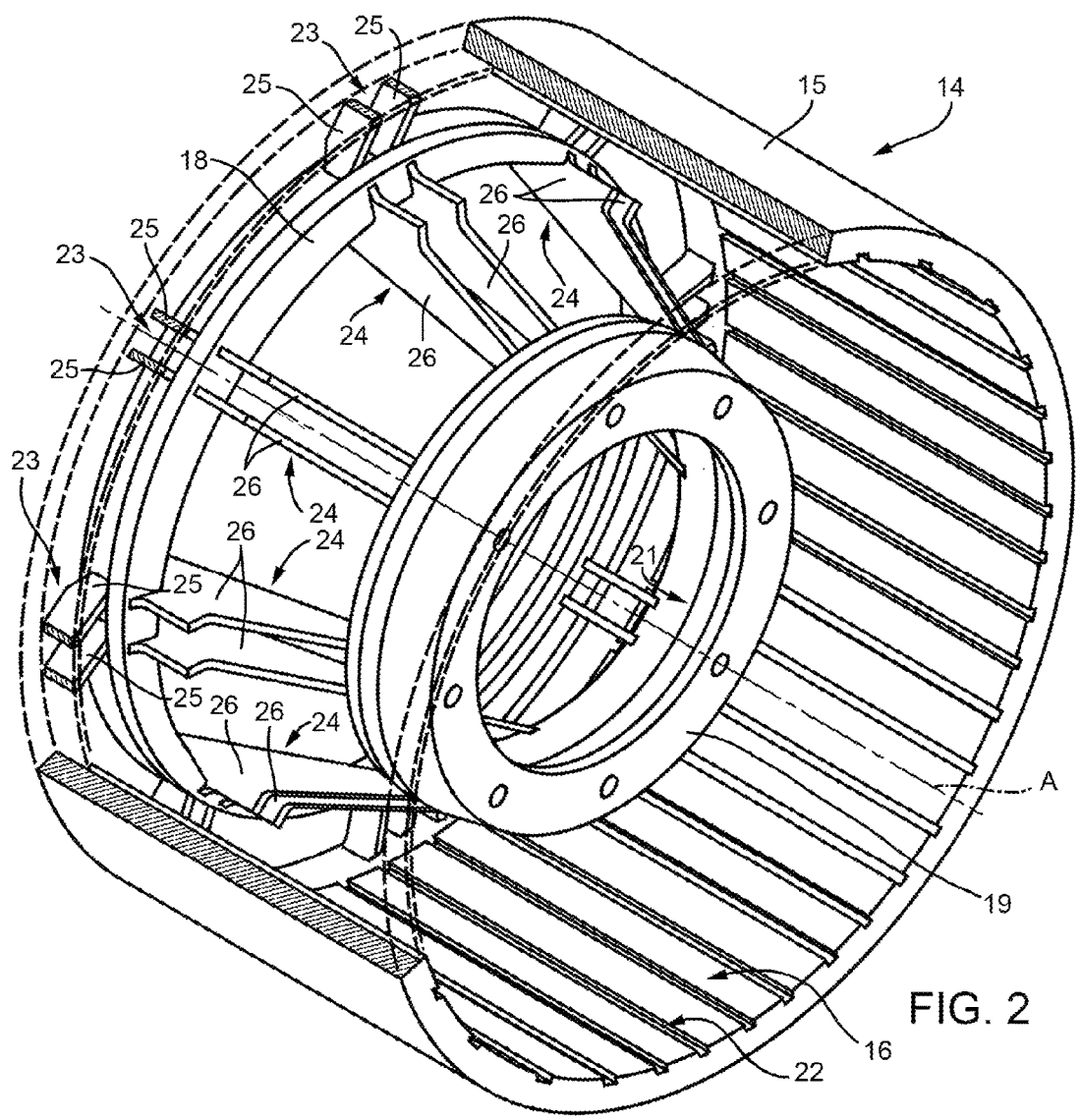
FIG. 2 shows a front view, with parts removed for clarity, of a frame in accordance with the present disclosure.
Figure 3:
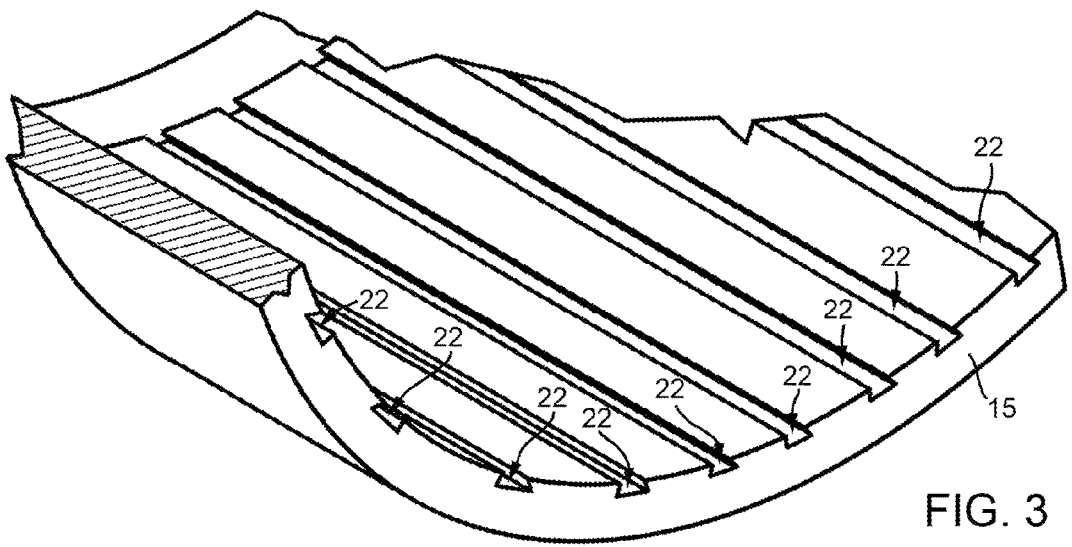
FIG. 3 shows a larger-scale view in perspective, with parts removed for clarity, of a detail of the FIG. 2 frame.

As shown in FIG. 2, cylindrical face 16 is an inner face of tubular structure 15. Fastening members 22 for active segments 17 (FIG. 1) are formed along cylindrical face 16. As shown in FIG. 3, each fastening member 22 is, in certain embodiments, defined by an axial groove having a dovetail cross section and engaged by a rib (not shown) on active segment 17 (FIG. 1).

As shown in FIG. 2, tubular structure 15 is cylindrical and extends about axis of rotation A. Annular flange 18 is coaxial with tubular structure 15 and smaller in diameter than cylindrical face 16. And ring 19 is coaxial with tubular structure 15 and smaller in diameter than annular flange 18.

Annular flange 18 is located inside one end of tubular structure 15, along axis of rotation A.

Ring 19 is located inside tubular structure 15, at the centre of tubular structure 15, along axis of rotation A.

Tubular structure 15, annular flange 18, and ring 19 are connected rigidly to one another by arms 23 and 24. More specifically, tubular structure 15 is connected to annular flange 18 by arms 23, which extend predominantly radially with a relatively small axial component; and annular flange 18 is connected to ring 19 by arms 24, which extend predominantly axially with a relatively small radial component.

Each arm 23 comprises two plates 25 parallel to each other and to axis of rotation A. And similarly, each arm 24 comprises two plates 26 parallel to each other and to axis of rotation A.

As shown in FIG. 1, annular flange 18 has a coupling seat 27 configured to connect to main frame 2 of the wind turbine. Frame 14 and main frame 2 are, in certain embodiments, connected by a bolted connection (not shown) between annular flange 18 and end flange 6. And the forces and moments induced by rotating electric machine 3 and blade assembly 4 are transmitted by the bolted connection to main frame 2.

Tubular structure 15, annular flange 18, and ring 19 are formed in one piece. In other words, the whole of frame 14 is cast in one piece, and is, in certain embodiments, made of steel.

Figure 4:
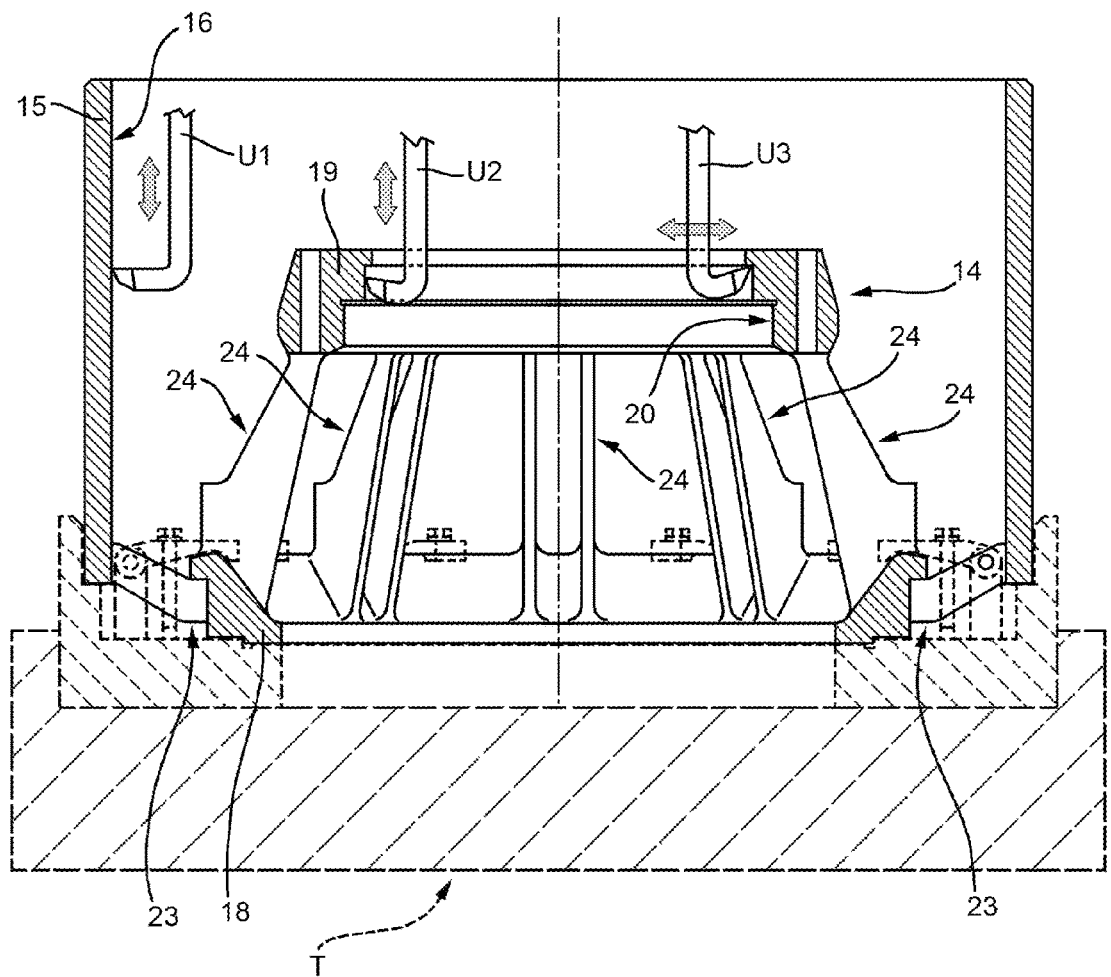
FIG. 4 shows a partly schematic side view, with parts removed for clarity, of a plurality of stages in the machining of the FIG. 2 frame.

Some parts of frame 14 are finish-machined, in particular by chip-forming machining operations. More specifically, machining is carried out along tubular structure 15, annular flange 18, and ring 19. More specifically, cylindrical face 16 and annular seat 20 are turned by tools U1, U2 and U3 on a machine tool T as shown in FIG. 4.

More specifically, cylindrical face 16 of tubular structure 15 and annular seat 20 of annular flange 18 are turned simultaneously on the same chip-forming machine tool T, to ensure cylindrical face 16 and annular seat 20 are as concentric as possible.

In certain embodiments, rotating electric machine 3 comprises bearing 21 to withstand radial and axial loads transmitted by tubular rotor 13 and blade assembly 4.

Figure 5:
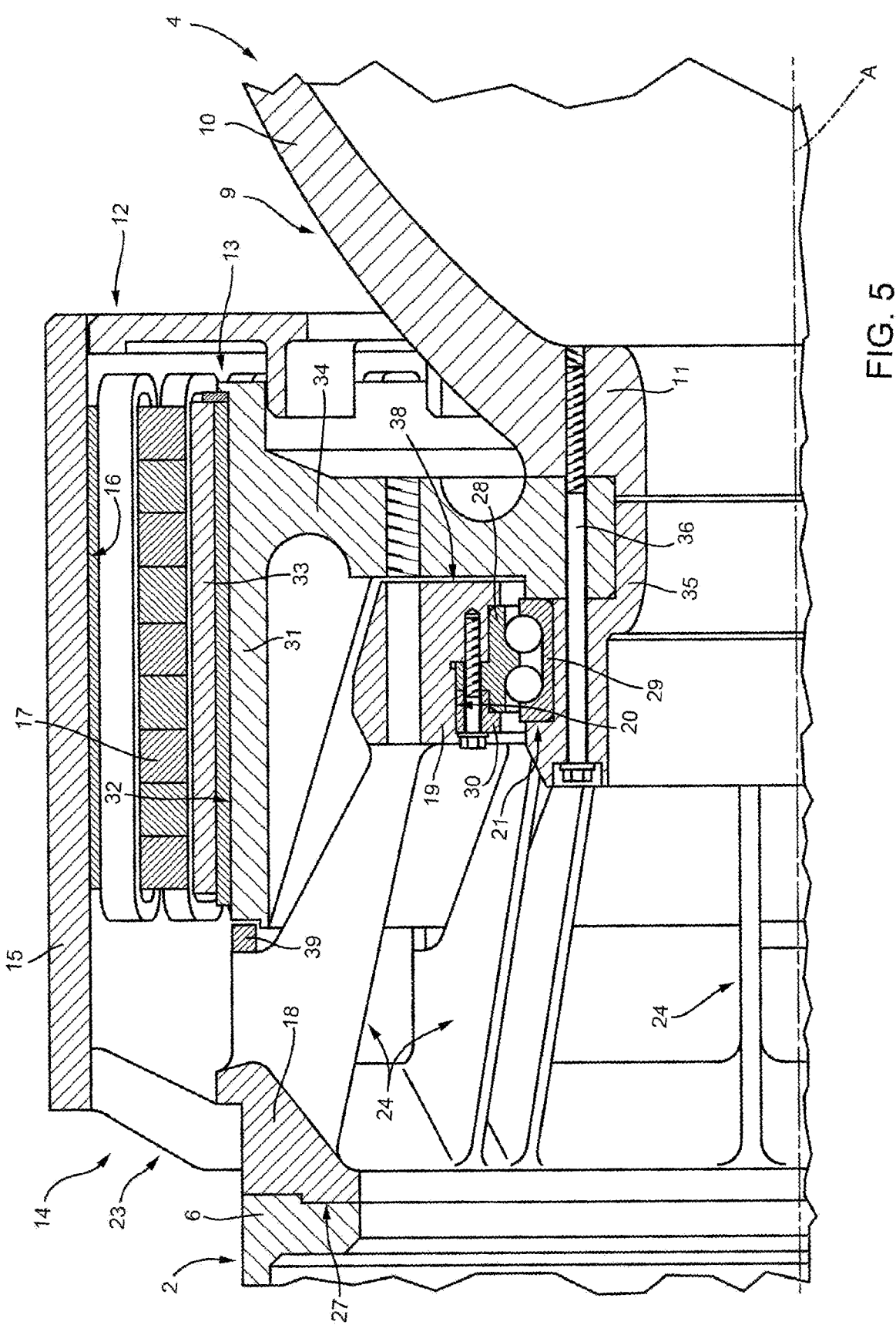
FIG. 5 shows a larger-scale side view, with parts removed for clarity, of a detail of the rotating electric machine in FIG. 1.

As shown in FIG. 5, bearing 21 comprises an outer race 28 and an inner race 29, and is housed in annular seat 20 of ring 19. More specifically, outer race 28 is housed in annular seat 20, and inner race 29 is connected to tubular rotor 13. Annular seat 20 has a stepped profile, with cylindrical faces alternating with annular supporting faces. Outer race 28 of bearing 21 is housed inside annular seat 20 and locked in position by a lock ring 30 bolted to ring 19 and outer race 28.

Tubular rotor 13 comprises a tubular structure 31 with a cylindrical face 32; a plurality of active rotor parts 33 arranged along cylindrical face 32 of tubular structure 31; and a radial structure 34 located inside tubular structure 31 and connected to bearing 21, in particular to inner race 29 of bearing 21. In other words, radial structure 34 is fixed, on one side, to bearing 21, and, on the opposite side, to hub 9, in particular to flange 11 of hub 9.

Radial structure 34 is fixed to bearing 21 and hub 9 by two bolted connections releasable independently of each other. Radial structure 34 is fixed using a lock ring 35 configured to partly house inner race 29 of bearing 21 and the end of radial structure 34 with flange 11 of hub 9.

One bolted connection comprises bolts 36, one of which, shown in FIG. 5, engages lock ring 35, radial structure 34 of rotor 13, and flange 11 of hub 9. The other bolted connection comprises bolts 37, which only engage radial structure 34 of rotor 13 and flange 11 of hub 9 (FIG. 1).

Radial structure 34 is connectable, in particular by a bolted connection, directly to ring 19. Radial structure 34 is located close to a face 38 of ring 19, and both radial structure 34 and ring 19 are configured to be connected integrally to each other. Radial structure 34 and ring 19 are connected to connect tubular rotor 13 directly to frame 14 when changing bearing 21.

Active rotor parts 33—in the example shown, permanent magnets mounted on respective supports—are prismatic modular segments, which extend predominantly parallel to, and are equally spaced about, axis of rotation A.

With reference to FIG. 2, active segments 17 and 33 are insertable or removable through the opening defined by adjacent arms 23.

With reference to FIG. 1, frame 14 has an emergency bearing 39 located along arms 24 and positionable contacting tubular rotor 13—in the example shown, tubular structure 31.

Clearly, changes may be made to the rotating electric machine described without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine rotating electric machine frame comprising:
    a tubular structure defining a space, said tubular structure having a cylindrical face and configured to support a plurality of active segments along the cylindrical face;
    an annular flange configured to connect a rotating electric machine to a main frame of a wind turbine, wherein an outer diameter of the annular flange is smaller than an inner diameter of the cylindrical face; and
    a ring defining an annular seat for a bearing, said ring being located within the space defined by the tubular structure;
    wherein the tubular structure, the annular flange, and the ring are integrally formed.

2. The wind turbine rotating electric machine frame of claim 1, wherein the tubular structure, the annular flange, and the ring are formed in one piece.

3. The wind turbine rotating electric machine frame of claim 1, wherein the tubular structure, the annular flange, and the ring are a one piece cast.

4. The wind turbine rotating electric machine frame of claim 3, wherein the cast is made of steel.

5. The wind turbine rotating electric machine frame of claim 1, wherein the cylindrical face of the tubular structure includes a mechanical chip-forming machine finished cylindrical face and the annular seat of the ring includes a mechanical chip-forming machine finished annular seat.

6. The wind turbine rotating electric machine frame of claim 5, wherein the finishing of the cylindrical face of the tubular structure and the annular seat of the ring occurs simultaneously.

7. The wind turbine rotating electric machine frame of claim 1, wherein the tubular structure includes a plurality of fastening members arranged, about an axis of rotation of the wind turbine rotating electric machine frame, along the cylindrical face, said plurality of fastening members configured to anchor the active segments to the tubular structure.

8. The wind turbine rotating electric machine frame of claim 7, wherein each fastening member is defined by an axial groove with a dovetail cross section.

9. The wind turbine rotating electric machine frame of claim 1, which includes a plurality of first arms configured to connect the annular flange to the tubular structure.

10. The wind turbine rotating electric machine frame of claim 9, wherein the first arms extend radially with respect to an axis of rotation of the wind turbine rotating electric machine frame.

11. The wind turbine rotating electric machine frame of claim 1, wherein the annular flange is located at one end of the tubular structure.

12. The wind turbine rotating electric machine frame of claim 1, wherein the annular flange and the ring are connected by a plurality of second arms.

13. The wind turbine rotating electric machine frame of claim 1, wherein the ring is located in a mid-position, with respect to the tubular structure, along an axis of rotation of the wind turbine rotating electric machine frame.

14. A wind turbine rotating electric machine frame comprising:

a tubular structure defining a space, said tubular structure having a cylindrical face and configured to support a plurality of active segments along the cylindrical face;

an annular flange configured to connect a rotating electric machine to a main frame of a wind turbine; and a ring defining an annular seat for a bearing, said ring being located within the space defined by the tubular structure, wherein an outer diameter of the ring is smaller than an inner diameter of the annular flange;

wherein the tubular structure, the annular flange, and the ring are integrally formed.

15. The wind turbine rotating electric machine frame of claim 14, wherein the tubular structure, the annular flange, and the ring are formed in one piece.

16. The wind turbine rotating electric machine frame of claim 14, wherein the tubular structure, the annular flange, and the ring are a one piece cast.

17. The wind turbine rotating electric machine frame of claim 16, wherein the cast is made of steel.

18. The wind turbine rotating electric machine frame of claim 14, wherein the cylindrical face of the tubular structure includes a mechanical chip-forming machine finished cylindrical face and the annular seat of the ring includes a mechanical chip-forming machine finished annular seat.

19. The wind turbine rotating electric machine frame of claim 18, wherein the finishing of the cylindrical face of the tubular structure and the annular seat of the ring occurs simultaneously.

20. The wind turbine rotating electric machine frame of claim 14, wherein the tubular structure includes a plurality of fastening members arranged, about an axis of rotation of the wind turbine rotating electric machine frame, along the cylindrical face, said plurality of fastening members configured to anchor the active segments to the tubular structure.

21. The wind turbine rotating electric machine frame of claim 20, wherein each fastening member is defined by an axial groove with a dovetail cross section.

22. The wind turbine rotating electric machine frame of claim 14, which includes a plurality of first arms configured to connect the annular flange to the tubular structure.

23. The wind turbine rotating electric machine frame of claim 22, wherein the first arms extend radially with respect to an axis of rotation of the wind turbine rotating electric machine frame.

24. The wind turbine rotating electric machine frame of claim 14, wherein the annular flange is located at one end of the tubular structure.

25. The wind turbine rotating electric machine frame of claim 14, wherein the annular flange and the ring are connected by a plurality of second arms.

26. The wind turbine rotating electric machine frame of claim 14, wherein the ring is located in a mid-position, with respect to the tubular structure, along an axis of rotation of the wind turbine rotating electric machine frame.

* * * * *